US 8,344,958 B2

(12) United States Patent
Artigue et al.

(10) Patent No.: US 8,344,958 B2
(45) Date of Patent: Jan. 1, 2013

(54) SECURED DOCUMENT WITH A CONTACTLESS CHIP WITH PROTECTION OF DATE AGAINST UNAUTHORIZED ACCESS

(75) Inventors: Olivier Artigue, Trets (FR); Cécile Sicot, Rousset (FR)

(73) Assignee: Smart Packaging Solutions (SPS), Rousset (FR)

( * ) Notice: Subject to any disclaimer, the term of this patent is extended or adjusted under 35 U.S.C. 154(b) by 349 days.

(21) Appl. No.: 12/670,664

(22) PCT Filed: Jul. 15, 2008

(86) PCT No.: PCT/FR2008/001030
§ 371 (c)(1),
(2), (4) Date: Jul. 22, 2010

(87) PCT Pub. No.: WO2009/030824
PCT Pub. Date: Mar. 12, 2009

(65) Prior Publication Data
US 2010/0283690 A1    Nov. 11, 2010

(30) Foreign Application Priority Data

Jul. 26, 2007   (FR) ...................................... 07 05486

(51) Int. Cl.
*H01Q 21/00*   (2006.01)
(52) U.S. Cl. . 343/728; 343/725; 343/841; 343/700 MS; 235/492; 340/572.7
(58) Field of Classification Search ............. 343/725, 343/728, 841, 700 MS; 235/487, 488, 492; 340/5.86, 10.3, 572.1, 572.4, 572.7, 572.8
See application file for complete search history.

(56) References Cited

U.S. PATENT DOCUMENTS

| 6,378,774 | B1 | 4/2002 | Emori et al. |
| 7,218,233 | B2 | 5/2007 | Bon |
| 7,395,972 | B2 | 7/2008 | Sickert et al. |
| 2007/0164866 | A1 | 7/2007 | Robin et al. |

(Continued)

FOREIGN PATENT DOCUMENTS

EP    1 031 939 A1    8/2000

(Continued)

OTHER PUBLICATIONS

International Search Report of Application No. PCT/FR2008/001030 dated Apr. 1, 2009.

*Primary Examiner* — Hoang V Nguyen
(74) *Attorney, Agent, or Firm* — Buchanan Ingersoll & Rooney PC (57) ABSTRACT

The invention relates to a secured document in the form of a booklet of at least one sheet which may be folded about a folding axis, the document having a transponder with an electronic chip provided with a memory for storing data and a transponder antenna. The document also includes a foldable amplifier antenna, distinct from the transponder antenna and arranged on the document such that, when the same is open, the amplifier antenna amplifies the electromagnetic flux received by the transponder antenna to permit communication of the document with a remote reader and, in the closed position of the document, the amplifier antenna reduces the electromagnetic flux received by the transponder antenna beneath a minimum threshold permitting communication of the electronic chip with a remote reader.

15 Claims, 6 Drawing Sheets

U.S. PATENT DOCUMENTS

| | | | |
|---|---|---|---|
| 2007/0222602 A1* | 9/2007 | Luo et al. | 340/572.7 |
| 2008/0314989 A1 | 12/2008 | Eray | |
| 2009/0057414 A1 | 3/2009 | Brunet et al. | |

FOREIGN PATENT DOCUMENTS

| | | |
|---|---|---|
| FR | 2 863 083 A1 | 6/2005 |
| FR | 2 882 174 B1 | 8/2006 |
| FR | 2 888 367 a1 | 1/2007 |
| FR | 2 888 653 A1 | 1/2007 |
| WO | WO 2005/045754 A1 | 5/2005 |
| WO | WO 2005/066890 A1 | 7/2005 |
| WO | WO 2006/005396 A1 | 1/2006 |

\* cited by examiner

SECURED DOCUMENT WITH A CONTACTLESS CHIP WITH PROTECTION OF DATE AGAINST UNAUTHORIZED ACCESS

The present invention relates to a secured document with a contactless chip with protection of data against unauthorised reading.

More and more secured documents, for example of the identity document type (passport, identification card, etc.) include a contactless reading electronic circuit. The electronic circuit, also called a transponder, is composed of an electronic module including a chip and it is connected to an antenna. This type of device makes it possible, for example to store in a digital form civil status personal data relating to identification, and biometric and/or administrative data. When the secured document must be controlled, for example to check the validity thereof, the stored data are remotely read by an appropriate receiving system, also called a reader, using an electromagnetic coupling between the electronic circuit of the secured document and the reader. Using contactless technologies offers significant advantages as regards lifetime and ergonomics.

However, it is important to guarantee the owner that the data on his or her identification document without his or her knowing. As a matter of fact, the contactless technology will be all the better accepted since the authorisation to read the data stored in the document remains under the control of the holder of the document.

The problem of protecting data against a reading made without the holder of the document knowing has already been mentioned in document WO 2005/066890. This document only relates to the case when the document chip is connected to an antenna of a relatively large dimension positioned on the same sheet as the chip and able to be directly in radiofrequency communication with a remote reader. The solution recommended by this previous document consists in positioning, opposite the antenna, a passive protection element capable of interfering with the electromagnetic coupling between the transponder and the reader antenna when the document is in the closed position.

Consequently, this document necessarily resorts to a passive protection element which represents an additional manufacturing cost and which implies one or several steps for the manufacturing thereof, which increases the cost of technology and consequently the cost of the final identification document.

In addition, this document does not make it possible to deal with the new case which has appeared, wherein the transponder of the document is manufactured on an added pad provided with a small sized antenna, as described in the application for the patent FR 05 01378 by the same applicant. In this case, the transponder of the document does not directly communicate with a remote reader using its small antenna, but communicates by mutual inductance with a larger amplifier antenna also positioned on the document which relays and amplifies the radiofrequency connection with the remote reader.

A document WO 2005/045754 is also known which discloses a passport provided with a transponder having a large sized antenna saddle positioned on two passport pages, such that in the closed position of the passport the electromagnetic field received by the transponder antenna is null and does not make it possible to supply the transponder chip.

This document does not make it possible to take advantage of the transponder technology in the form of an added pad to be built in the passport, such as described in the above-mentioned application FR 05 01378. In addition, as the antenna of the transponder is of a large dimension and as it is directly connected to the transponder chip, if the antenna is broken which is liable to happen upon folding the antenna, the whole passport must be replaced, which means an important cost.

Consequently, one object of the invention is to provide a new structure of the secured document, more particularly an electronic passport meeting the deficiencies of the passports described in the prior art and to provide an efficient protection against the untimely reading of the passport data, while optimising the communication with the remote reader.

Another object of the invention is to provide a new structure of an electronic passport which should be particularly simple and economic to manufacture while preserving the efficiency of the protection of data against an unauthorised reading.

For this purpose, the object of the invention is a secured document in the form of a booklet of at least one sheet which may be folded about a folding axis defining a first part and a second part of the document, the document having a transponder with an electronic chip provided with a memory for storing data and a transponder antenna, characterised in that it further comprises a foldable amplifier antenna, distinct from the transponder antenna and arranged on the document, such that when the same is open said antenna amplifies the electromagnetic flux received by the transponder antenna so as to permit communication of the document with a remote reader and in the closed position of the document, said antenna reduces the electromagnetic flux received by the transponder antenna beneath a minimal threshold permitting communication of the electronic chip with a remote reader.

Thus, in the open position of the booklet, the amplifier antenna of the document has a reader electromagnetic flux receiving surface also called the antenna effective surface which is sufficient to provide communication between the electronic chip and the remote reader through the transponder antenna and the amplifier antenna.

On the contrary, in the closed position of the booklet, the amplifier antenna has an insufficient effective surface to provide this communication.

As a matter of fact, according to the invention, folding the document to bring it in the closed position involves the folding of the document amplifier antenna, which interferes with the electromagnetic behaviour of the whole document, so much so that it inhibits any communication with a remote reader. Then, folding the document makes it possible to reduce to an almost null value the effective surface of the amplifier antenna providing the communication with a distant reader and consequently to significantly reduce the flux received by the amplifier antenna when the booklet is in the closed position. Therefore, the current induced by mutual inductance in the transponder antenna is no longer sufficient to provide the operation of the transponder chip. The result is that the data stored in the document chip are protected against the reading without the document holder knowing it.

As an alternative, the invention provides that the amplifier antenna includes in addition to the windings providing the amplification of the flux received by the transponder antenna, at least flux concentrator means making it possible to concentrate the flux received from the reader to the transponder antenna. The communication with a remote reader is thus improved when the document is in the open position.

The amplifier antenna is of a larger size than the transponder antenna and it is saddle positioned on a document sheet on either side of the folding axis thereof, such that in the closed position of the document, the amplifier antenna inhibits the radiofrequency communication between the transponder antenna and the reader antenna, whereas in the open position of the document the amplifier antenna facilitates this communication.

The foldable amplifier antenna may be positioned at various locations on the document. Thus, according to an alternative embodiment, the document is in the form of a booklet and the foldable antenna is saddle positioned on the secured document cover sheets. According to another alternative, it is positioned on two contiguous internal pages of the document. The transponder antenna can be positioned on the same sheet of the document as the amplifier antenna, so as to provide the possibility of coupling by mutual inductance.

According to another embodiment, the amplifier antenna of the document and the electronic transponder provided with an antenna are respectively supported by one of said booklet cover sheets and one of the loose leaves of the booklet. However, it is also possible to adopt a position wherein the document amplifier antenna and the transponder are respectively supported by one of the sheets of the booklet and by one of said cover sheets of the booklet.

According to an even more sophisticated alternative embodiment of the invention, it is still possible to increase the document security using an element for protecting the electromagnetic flux, positioned on one of the sheets of the document, such that in the open position of the document, it does not protect the electromagnetic flux sent to the transponder antenna, and that in the closed position of the document, it is superimposed with the transponder antenna so that it inhibits or interferes with the communication between the transponder and the amplifier antenna, and consequently the remote reader.

In the latter alternative embodiment, the protection element can advantageously be composed of the widened track of one of the windings of the amplifier antenna or any other massive element such as a token, such widened track being positioned such that, in the closed position of the document, it is placed opposite the transponder antenna so as to inhibit any electromagnetic communication thereof with an external reader even with a strong reading power.

Other characteristics and advantages of the invention will appear upon reading the detailed description and the appended drawings, wherein.

Figure 1A:
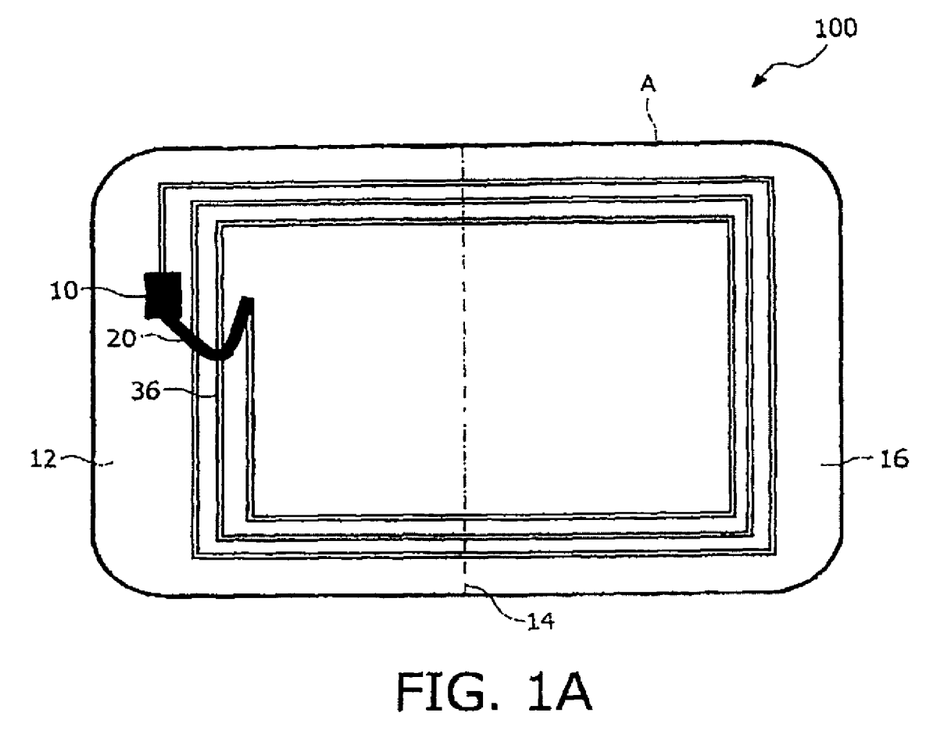
FIGS. 1A/1B illustrate an electronic passport provided with means inhibiting the untimely reading of data according to a structure complying with the prior art.
Figure 1B:
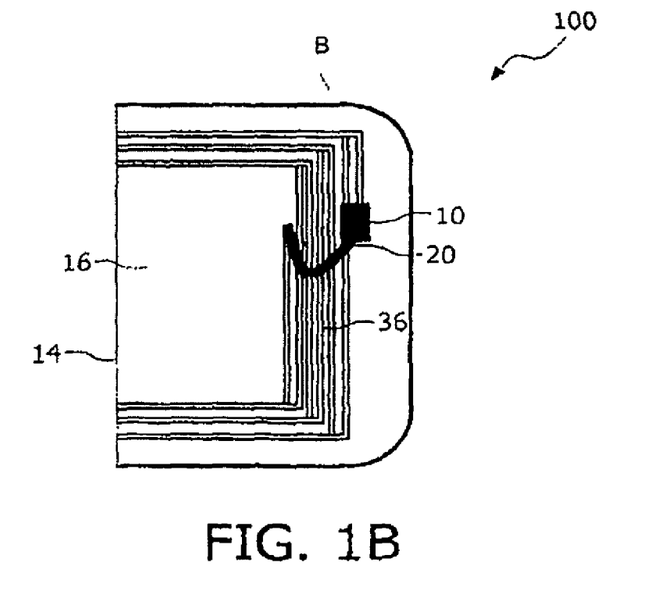

Reference is made to FIG. 1. In this Figure which is taken from document WO 2005/045754 and for which the original reference numbers were kept, the secured document 100 is shown in the open position in FIG. 1A and in the closed position in FIG. 1B. It can be seen that a large sized antenna is saddle positioned on one sheet of the document, on either side of a symmetry axis 14 corresponding to the folding axis of the document to bring it into the closed position. It is clear that in the open position of the document, the electromagnetic flux sent by a remote reader and received by the document antenna will supply the chip 10 and enable the operation thereof. Whereas, in the closed position of the document, the current induced in the antenna by both half-antennas cancel each other. The result is that the chip 10 is no longer supplied and the communication with a remote reader cannot be provided.

This operation is advantageous but has a few drawbacks however. As a matter of fact, the secured document such as described above requires the production of an electric connection 20 on the document itself between the transponder antenna and the chip terminals. This is a delicate operation which affects the manufacturing output which is a problem for example in the case of the manufacturing of secured passports.

In addition, as the foldable antenna is composed of the transponder antenna, the structure of this document is not appropriate to receive the second antenna or amplifier antenna liable to improve the communication with a remote reader.

In addition, a foldable transponder antenna can generate however some induced current when the power sent by the remote reader increases, such that said structure does not have a very efficient protection under certain circumstances against the untimely reading of the chip data.

Figure 2:
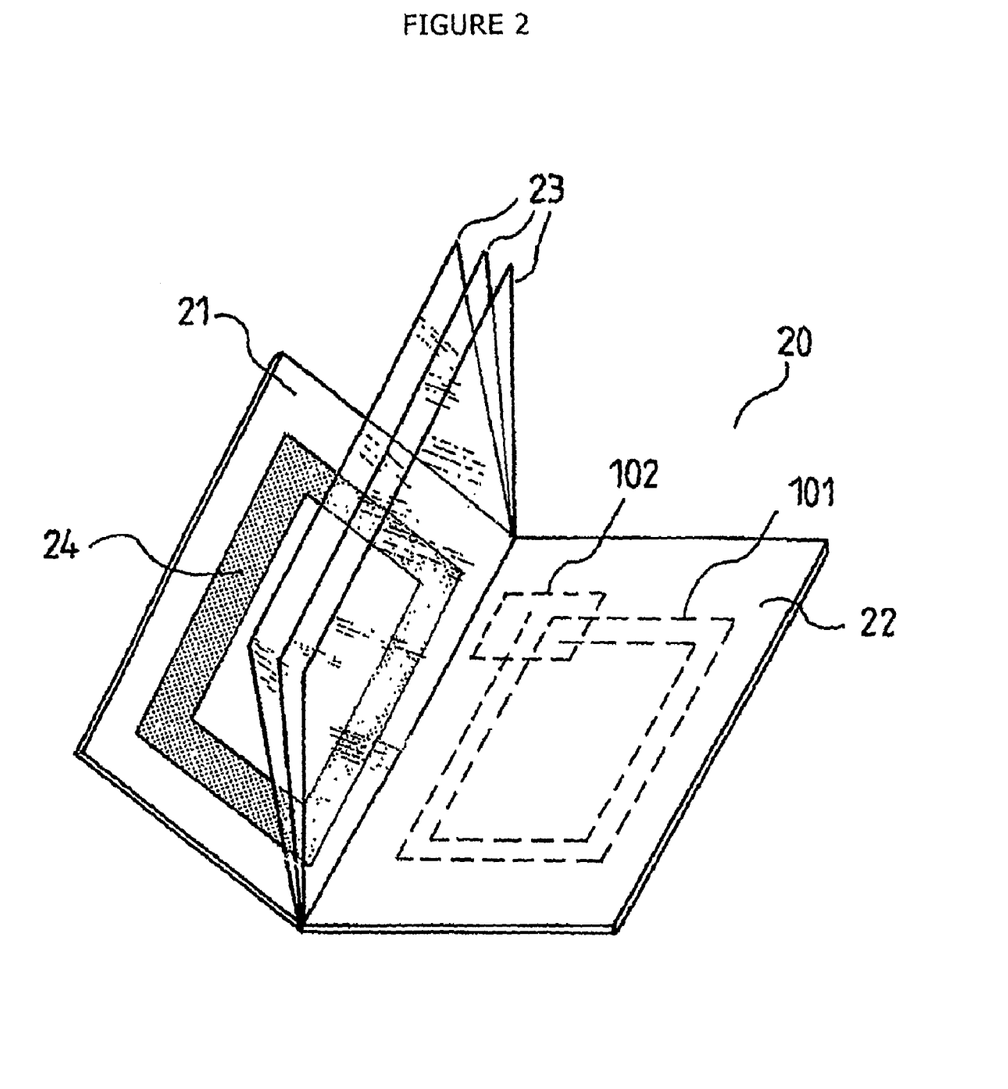
FIG. 2 illustrates another passport provided with means for inhibiting the unauthorised reading of data according to another known structure of the prior art.

Reference is made to FIG. 2. In this Figure, taken from the document WO 2005/066890 and for which the original reference numbers were kept, an electronic passport is shown according to the state of the art which already provides the protection of data enabling the document holder to restore the voluntary authorisation to read the documents. A booklet 20 of the passport type includes two front and back cover sheets (21, 22) and a set of loose leaves (23).

The contactless chip secured document includes a transponder in the form of an electronic module 102 connected to one antenna 101. The antenna, conventionally a wound wire, is positioned on a given surface of a first part of the document, for example one of the cover sheets 22 of the booklet 20. The transponder is intended to communicate through an electromagnetic coupling with a remote reader, not shown in FIG. 2. The secured document further includes a passive protection element 24 of the antenna, supported by the cover sheet 21 of the booklet and able to interfere with the coupling between the transponder and the reader to make the reading of the document in the closed position of the document almost impossible.

Then, in the example shown in FIG. 2, the protection element is selected to make the reading almost impossible when the booklet is closed.

The passive protection element 24 is formed of a material able to sufficiently interfere with the coupling, for example a metallic material or a magnetic material, to inhibit the reading of the chip. As a matter of fact, the quality and the quantity of the energy transfer between the reader and the transponder depend on the frequencies on which the circuits of the transponder antenna and of the reader are tuned, on the coupling coefficient, as well as on the quality coefficient of the tuned circuits of the reader and the transponder. This prior document uses the fact that any interference of electric or magnetic origin of the transponder antenna circuit may involve interference in the coupling.

It also can be noted that the secured document according to this prior document requires a passive element 24 of a relatively large size to protect data against untimely reading. Furthermore, this embodiment is not adapted to methods for manufacturing secured documents, the transponder of which is positioned on an added pad, and which on the other hand include a larger amplifier antenna. In addition, the simple presence of the passive protection element may not be sufficient to provide the protection of data in the chip when the reading power sent by the reader increases.

Figure 3A:
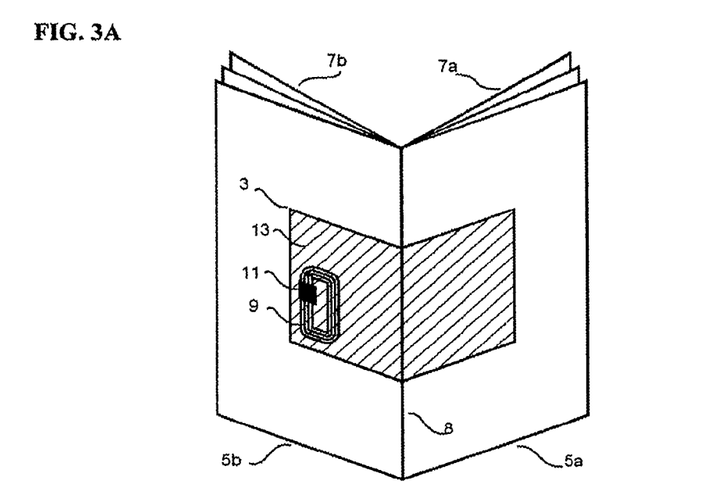
FIGS. 3A and 3B are perspective views of an electronic passport according to the invention in the open position and in the closed position.
Figure 3B:
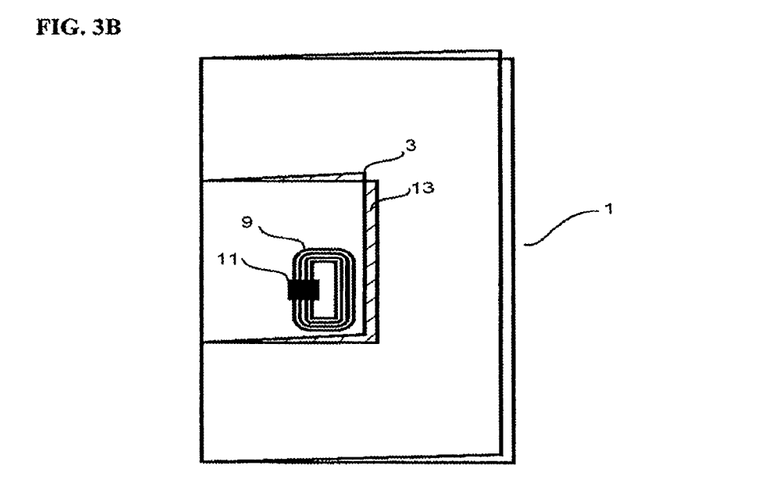
Figure 3C:
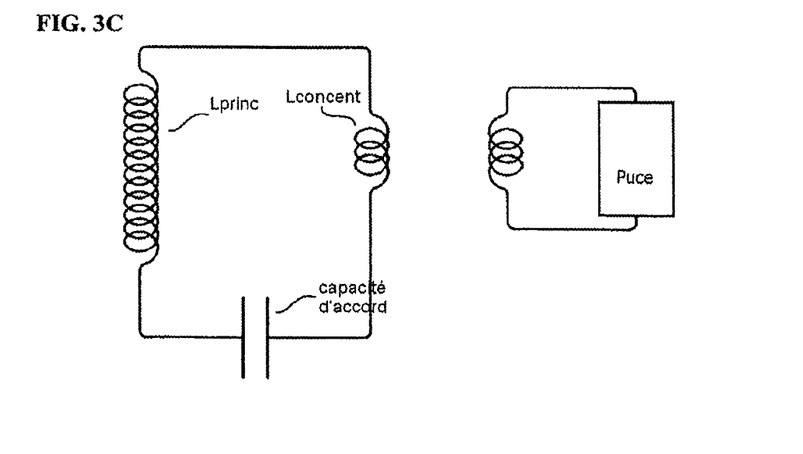
FIGS. 3C and 4C show electric diagrams equivalent of the passports of FIGS. 3A, 3B, 4A, 4B, respectively in the open position and in the closed position.
Figure 4A:
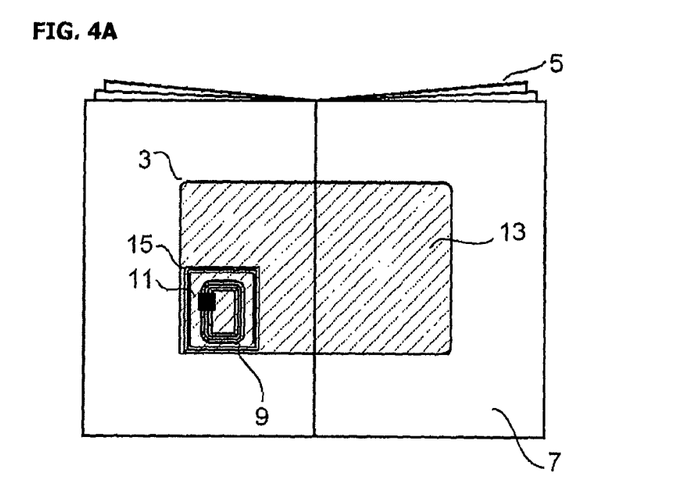
FIGS. 4A and 4B show a first alternative embodiment of the passport of FIGS. 3A and 3B.
Figure 4B:
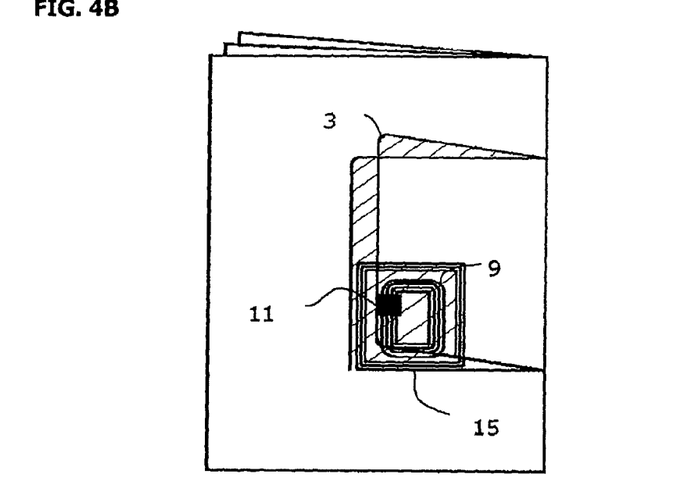
Figure 4C:
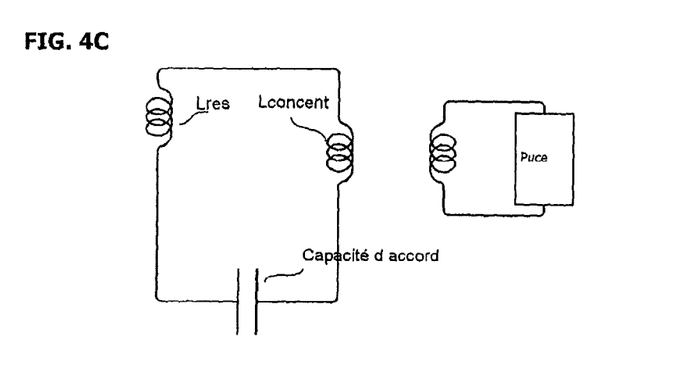

Reference is now made to FIGS. 3 and 4 corresponding to the first two alternative embodiments of the invention able to remedy the drawbacks of the state of the art. In these alternative embodiments, the transponder antenna is associated with a foldable amplifier antenna located on the document. In this case, the document 1 thus includes two antennas, i.e. a first antenna or amplifier antenna 3 having relatively large dimensions saddle positioned on a foldable sheet of the document, and a second antenna 9 or transponder antenna, electrically connected to the chip 11 of the electronic module which includes the memory hosting the data to be protected. In the case of a passport, the document 1 is in the form of a booklet, the sheets of which are composed of a cover sheet 5 and internal loose leaves 7. All the sheets 5, 7 can be folded about a folded axis 8 so as to define two parts (5a, 5b), (7a, 7b) for each sheet.

FIGS. 3A and 3B correspond to the simplest case of the invention with an amplifier antenna 3 having an effective surface 13 shown in hatching lines, such effective surface 13 having a variable surface according to the degree of opening of the document.

FIGS. 4A to 4B correspond to the case where the amplifier antenna 3 further includes a flux concentrator 15 in the form of an additional coil positioned about the area of the transponder and the antenna 9 thereof, and which makes it possible to further concentrate the flux received by the amplifier antenna 3 to the transponder antenna 9.

The operation of the document shown in FIGS. 3 and 4 is such that when the document is closed again as shown in FIG. 3B or 4B, the efficient surface 13 of the amplifier antenna 3 which corresponds to the receiving surface thereof decreases and tends to zero. Consequently, the resonance between both antennas 3, 9 cannot occur at the typical operation frequency (carrier frequency). When the document is in the closed position, the amplifier antenna 3 is operated in a degraded mode and consequently plays an interfering part because it is no longer adapted to the propagation medium.

In addition, the transponder antenna 9 is so configured that under normal reading power conditions, it is not able to provide a sufficient flux in itself from the reader to supply the chip 11.

Electrically speaking, the operation of the alternative document according to FIGS. 4A, 4B can also be explained using the equivalent diagrams of FIGS. 3C (passport in the open position) and 4C (passport in the closed position).

The adjustment of the tuning frequency noted $F_A$ of the amplifier antenna 3 when the passport of the open position is such that:

For the open passport (FIG. 4A):

$F_A$ open=½*Π*$\sqrt{(Lmain+Lconcentrator)*Ca}$, where Ca is the capacity of the amplifier antenna, Lmain is the inductance of the amplifier antenna 3 and Lcontentrator is the inductance of the concentrator 15.

The tuning capacity Ca is so selected as to optimise the adaptation of the coupled system of both antennas 3, 9 to the propagation medium.

For the closed passport (FIG. 4B):

When the amplifier antenna 3 is folded, the equivalent surface thereof is reduced which implies that less electromagnetic flux is received. The electric parameter of inductance Lmain is significantly modified and is replaced by a residual inductance noted Lres. The circuit of adaptation to the propagation medium is consequently significantly modified and the adaptation to the propagation medium no longer occurs. The result is the non operation of the chip 11 in radio communication on the standard frequency and the data of the chip are consequently protected against reading.

For the closed passport:

$F_A$ closed=½*Π*$\sqrt{(Lres+Lconcentrator)*Ca}$) with Lres being much different than L main. The circuit no longer operates to provide adaptation to the propagation medium and thus inhibits the operation of the chip through the original channel RF.

The operation of the device shown in FIGS. 3A and 4A without a concentrator 15 is similar but without the Lconcentrator factor in the above formulas.

Figure 5A:
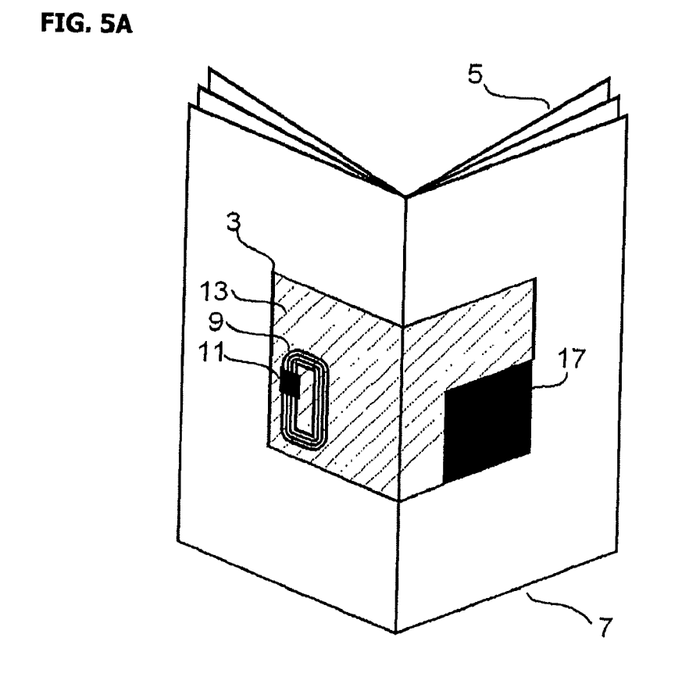
FIGS. 5A and 5B show a second alternative embodiment of the passport of FIGS. 3A and 3B wherein the passport is further provided with a passive protection element.
Figure 5B:
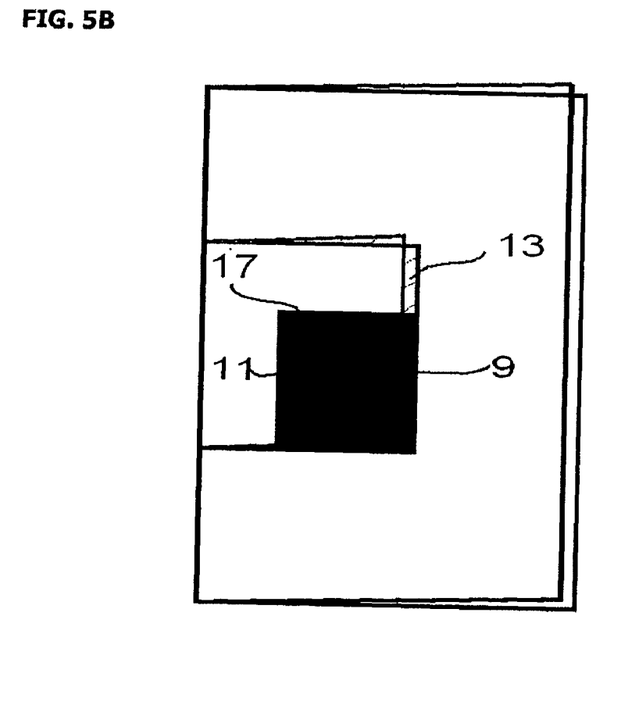

Reference is now made to FIGS. 5A and 5B to describe the case where the transponder antenna 9 is associated with a foldable amplifier antenna 3 and further to an electromagnetic armouring element 17.

In order to further improve the security against untimely reading of data, an alternative embodiment of the invention provides having an electromagnetic protection element 17 on one of the sheets of the document.

According to the invention, the latter is of a reduced size which is just equivalent or slightly greater than the size of the transponder antenna 9. In addition, the protection element 17 is positioned on one of the sheets of the document so that in the closed position of the document the protection element 17 is superimposed to the area covered by the transponder antenna 9, so as to cancel the possibility of the latter to communicate with the amplifier antenna or with a remote reader antenna.

Of course, the protection element 17 must be positioned on an appropriate page of the document, so that in the open position of the document, it is not facing the transponder antenna 9. In order to limit manufacturing costs of the protection element 17, the latter can be made with a conductive patch (for example by silver serigraphy) or current loop like for example a serigraphied conductive pattern forming a metallic ring or a conductive ring which cancels the magnetic field, or by any one of the techniques for manufacturing a magnetic armouring described in the prior art document WO 2005/066890.

Figure 6A:
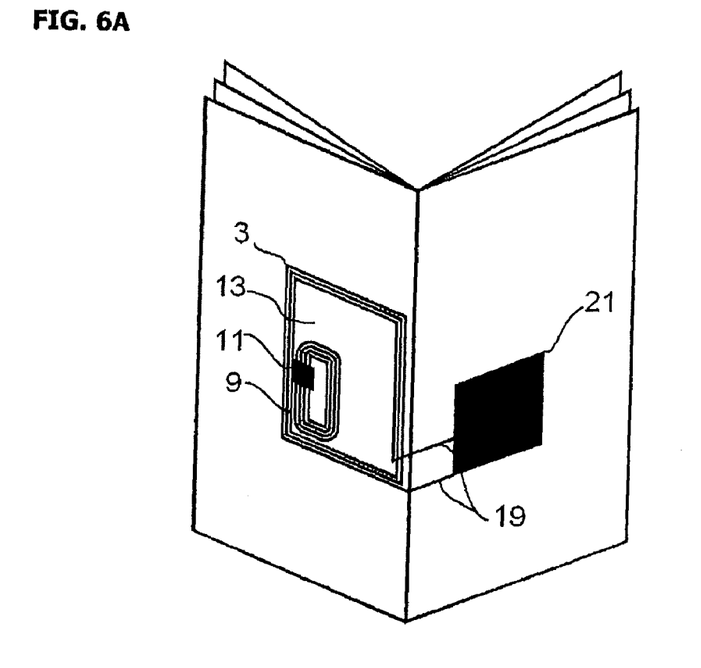
FIGS. 6A and 6B show a third alternative embodiment of the passport of FIGS. 3A and 4B wherein the passport is further provided with a passive protection element.
Figure 6B:
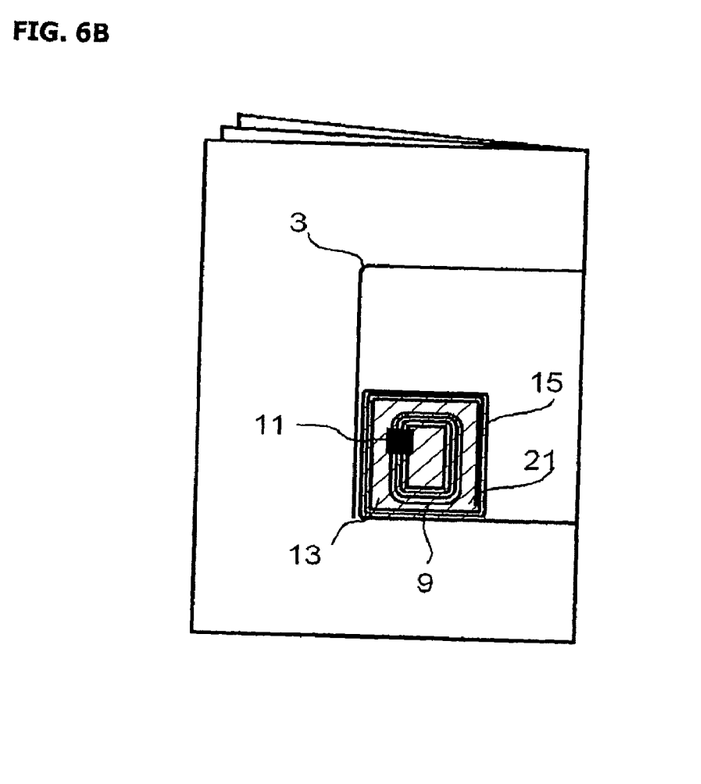

Reference is now made to FIGS. 6A and 6B to describe an advantageous variation of the preceding case with a protection element. In this alternative solution, the amplifier antenna 3 is made of a set of windings which are mainly positioned on only one page of the passport, but one of the windings extends to another page of the passport so that the antenna remains foldable. The winding 19 which extends up to a page adjacent to the page bearing the other windings has a significantly widened track. The significantly widened part 21 of the windings 19 is positioned such that in the closed position of the passport, it faces the transponder antenna 9 so as to cover the area of the transponder antenna.

As shown in FIG. 6B (hatched area), when the amplifier antenna 3 is further provided with a flux concentrator 15, the widened part 21 of the winding 19 is preferably big enough to also cover the area of the flux concentrator 15.

Then, using a widened track 19 of the amplifier antenna 3, the passive protection element functionally equivalent to the protection element 17 described in relation with the embodiment of FIGS. 5A, 5B is recreated with a greater ease of manufacture and lower cost, since it is sufficient to modify one of the windings of the amplifier antenna without having to add an additional component.

It should be noted that when combining the characteristics of an amplifier antenna 3, provided or not with a flux concentrator 15, and the existence or the absence of a protection element (17, 19) of the transponder antenna, and when acting on the respective position of the transponder antenna 9, the amplifier antenna and the protection element (17, 19) if any, an important functional resource liable to cover all the situations in which the secured documents 1 must be able to communicate with a remote reader when in open position, and must be able to cancel any communication when the document is in the closed position, can be obtained.

As regards the embodiment of the transponder and the antenna 9 thereof, it is possible to provide them directly on one sheet of the secured document, as known per se. But the invention provides that in all the alternative solutions of FIGS. 3 to 6, the transponder is preferably provided on an added pad, in compliance for example with the one described in the application FR 05 01378 by the same applicant.

This procedure makes it possible to obtain manufacturing outputs which are more important for the completed secured document.

This solution also provides the additional advantage that the document 1 can be separately manufactured and be provided with a foldable amplifier antenna 3 and if need be a protection element (17, 19) and to add the transponder pad on the document only at the last moment upon customisation and delivery of the secured document to the user thereof.

Alternatively, it is also possible to prepare the document with the transponder pad and to build-in the amplifier antenna using an adhesive tape in a last manufacturing step.

It is also possible to prepare the document except for the addition of the transponder pad, and to build-in the transponder pad and the addition of an adhesive tape bearing the amplifier antenna during a last manufacturing step.

In addition, if the amplifier antenna breaks, it can simply be replaced by another amplifier antenna by positioning a sticking support bearing a new amplifier antenna and it is no longer necessary to replace the whole passport. This characteristic may enable the authorities to temporarily cancel the radiofrequency function when the national's passport is in the open position and to subsequently restore such function without having to change the passport.

It also be noted that, in practice, other alternative embodiments of the invention can be provided beyond those shown in the Figures without leaving the scope of the invention by modifying the pages of the document on which the transponder, the amplifier antenna and the protection element, if any, are positioned.

Among the non-limitative exemplary embodiments covered by the invention, the following ones can be mentioned:

1. The transponder is positioned on a first sheet of a document to be folded. An amplifier antenna 3 is saddle positioned on the same sheet and on the folding line. In the open position, the coupling between the amplifier antenna and the transponder provides the document functionality. In the closed position, the characteristics of the amplifier antenna are modified (equivalent surface, radiation diagram, electric characteristics) and inhibit the correct operation of the product.

2. Like the preceding example, but the amplifier antenna 3 is positioned on another sheet than a transponder.

3. An interfering or protection system is introduced. This small sized element, preferably of intermediate dimensions between the dimensions of the amplifier antenna and the transponder antenna, is placed on the document to interfere with the coupling between the amplifier antenna 3 and the transponder antenna 9.

4. The transponder, the amplifier antenna and the protection element are positioned on one sheet of the document to be folded. The transponder and the protection element are positioned inside the area covered by the amplifier antenna. The amplifier antenna is saddle positioned on the folding line. The protection element and the transponder are positioned on either side of the folding line so that in the closed position of the document, the protection element is superimposed with the transponder antenna. In the open position of the booklet of the document, the protection element does not interfere with the coupling between the amplifier antenna in operation mode and the transponder. The product is then capable of communicating with an external reader.

5. As an alternative to the preceding case, the transponder is positioned on another sheet than the amplifier antenna and the protection element is again positioned on a different sheet.

6. Advantageously, it is possible to provide, within the amplifier antenna, a flux concentration device favouring the coupling between the latter and the transponder. The device in the case of inductive antennas can be provided as in patent no EP 1.031.939. In the open position of the document, the coupling between the amplifier antenna and the transponder through the concentrator then provides the product functionality. In the closed position, the characteristics of the amplifier antenna and the concentrator are modified (equivalent surface, radiation diagram, electric characteristics) and inhibit the correct operation of the product by interfering with the direct flux between the transponder and the external reader.

The persons skilled in the art will choose the dimensions of components to provide an operation in compliance with the prevailing standards such as for example ISO 10536, ISO 11784, ISO 11785, ISO 14223, ISO14443, ISO 15693 and other ones in UHF and VHF. More particularly, to be able to read the data of the document when the document is in a substantially open position, an activation field greater than 1.5 amperes/metre (minimum value of activation in the standard ISO14443) makes it possible to generate an induced current sufficient to read the data in the chip in the transponder antenna of the document. On the contrary, when the passport is in the closed position, the electric and geometric qualities inhibit the reading of the chip with conventional instruments even with a field much greater than 7.5 A/m (7.5 A/m maximum value of the radiated field by a commercially available reader in compliance with standard ISO14443 and associated ones).

The solutions in compliance with the invention provide several advantages with respect to the state of the art. Then the simple fact of closing the secured document results in the folding of the amplifier antenna to cancel any capacity of communication of the document through an electromagnetic channel with a remote reader.

This solution with a foldable amplifier antenna and all the alternative embodiments described consequently enables a simplified manufacturing of the document and a lower cost with respect to the known solutions with a greater global manufacturing output, while optimising the resistance of the document to unauthorised attempts to read data in the chip of the transponder.

The invention claimed is:

1. A secured document in the form of a booklet of at least one sheet which can be folded about a folding axis, the document having a transponder with an electronic chip provided with a memory for storing the data and a transponder antenna, and further comprising a foldable amplifier antenna, distinct from the transponder antenna and arranged on the document such that when the same is open, said amplifier antenna amplifies the electromagnetic flux received by the transponder antenna to permit communication of the document with a remote reader and, in the closed position of the document, said amplifier antenna reduces the electromagnetic flux received by the transponder antenna beneath a minimum threshold permitting communication of the electronic chip with a remote reader.

2. A secured document according to claim 1, wherein the foldable amplifier antenna is positioned on a foldable sheet of the booklet, on either side of the folding axis thereof, so that the closing of the booklet brings the effective area of said foldable amplifier antenna beneath the effective surface of the antenna required to be able to communicate with the transponder antenna.

3. A secured document according to claim 2, wherein the amplifier antenna has dimensions above those of the transponder antenna and is saddle-positioned on a sheet of the document, on either side of the folding axis thereof, such that in the closed position of the document, the amplifier antenna inhibits the radio frequency communication between the transponder antenna and the reader antenna.

4. A secured document according to claim 3, wherein the amplifier antenna of the document and the transponder provided with an antenna are supported by the sheets inside the booklet.

5. A secured document according to claim 4, wherein the amplifier antenna includes, in addition to windings providing the amplification of the flux received by the transponder antenna, at least one flux concentrator making it possible to concentrate the flux received from the reader to the transponder antenna.

6. A secured document according to claim 3, wherein the amplifier antenna of the document and the transponder provided with an antenna are respectively supported by a cover sheet of the booklet and one of the sheets inside the booklet.

7. A secured document according to claim 6, wherein the amplifier antenna includes, in addition to windings providing the amplification of the flux received by the transponder antenna, at least one flux concentrator making it possible to concentrate the flux received from the reader to the transponder antenna.

8. A secured document according to claim 3, wherein the amplifier antenna of the document and the transponder provided with an antenna are respectively supported by one of the sheets inside the booklet and by one of the cover sheets of the booklet.

9. A secured document according to claim 8, wherein the amplifier antenna includes, in addition to windings providing the amplification of the flux received by the transponder antenna, at least one flux concentrator making it possible to concentrate the flux received from the reader to the transponder antenna.

10. A secured document according to claim 3, wherein the amplifier antenna includes, in addition to windings providing the amplification of the flux received by the transponder antenna, at least one flux concentrator making it possible to concentrate the flux received from the reader to the transponder antenna.

11. A secured document according to claim 2, wherein the amplifier antenna includes, in addition to windings providing the amplification of the flux received by the transponder antenna, at least one flux concentrator making it possible to concentrate the flux received from the reader to the transponder antenna.

12. A secured document according to claim 1, wherein the amplifier antenna includes in addition to windings providing the amplification of the flux received by the transponder antenna, at least one flux concentrator making it possible to concentrate the flux received from the reader to the transponder antenna.

13. A secured document according to claim 12, further including an element for protecting the electromagnetic flux positioned on one of the sheets of the document, such that in the closed position of the document, the protection element is superimposed with the transponder antenna to inhibit the communication between the transponder and the remote reader.

14. A secured document according to claim 13, wherein the protection element is in the form of a widened track of a winding of the amplifier antenna.

15. A secured document according to claim 14, wherein the transponder provided with an antenna is positioned on a pad added on and integral with one of the sheets of the document.

* * * * *